(12) United States Patent
Erickson et al.

(10) Patent No.: US 7,677,724 B1
(45) Date of Patent: Mar. 16, 2010

(54) SPECTACLE FRAME MOUNT FOR FACE MASK

(75) Inventors: Evan Keith Erickson, Sarver, PA (US); Joseph John Vod Varka, McKees Rocks, PA (US); Joseph Aaron Vod Varka, McKees Rocks, PA (US); Jesse James Vod Varka, McKees Rocks, PA (US)

(73) Assignee: Mine Safety Appliances Company, Pittsburgh, PA (US)

( * ) Notice: Subject to any disclaimer, the term of this patent is extended or adjusted under 35 U.S.C. 154(b) by 0 days.

(21) Appl. No.: 12/435,475

(22) Filed: May 5, 2009

Related U.S. Application Data

(60) Provisional application No. 61/157,959, filed on Mar. 6, 2009.

(51) Int. Cl.
*G02C 1/00* (2006.01)
(52) U.S. Cl. ............. 351/158; 2/13; 2/441; 128/201.12

(58) Field of Classification Search ................. 351/158, 351/41; 2/10, 12, 13, 426, 439, 441, 444; 128/201.12
See application file for complete search history.

(56) References Cited

U.S. PATENT DOCUMENTS

| 3,563,640 | A | * | 2/1971 | Wise et al | ............... 351/158 |
| 4,023,214 | A | * | 5/1977 | Waldherr | ................... 2/444 |
| 7,494,218 | B1 | * | 2/2009 | Rotella | ................ 351/158 |

* cited by examiner

*Primary Examiner*—Hung X Dang
(74) *Attorney, Agent, or Firm*—James G. Uber; Henry E. Bartony, Jr.

(57) ABSTRACT

A spectacle frame mount provides secure, removable positioning of a spectacle frame in a gas mask or full face respirator. A spring wire mount supports the spectacle frame between two legs of a loop. The spring wire mount includes two leg portions that have lower ends which terminate adjacent each other when the mount is in its use position. The two leg portions positively engage an internal portion of the full face mask so that the spectacle frame will be positioned within the interior of the mask at a location such that the spectacles will be properly positioned for use by the person wearing the mask.

20 Claims, 9 Drawing Sheets

SPECTACLE FRAME MOUNT FOR FACE MASK

FIELD OF THE INVENTION

The present invention is directed generally to a spectacle frame mount for use in a gas mask or full face respirator. More particularly, the present invention is directed to a spectacle frame mount that is adapted to position and to support a spectacle frame for pair of eye glasses in a gas mask or full face respirator. Most specifically, the present invention is directed to a spectacle frame mount which is removably positionable in a gas mask or full face respirator.

The spectacle frame mount is configured with a spring wire support structure that is adapted to form a spring-biased, retentive fit within a full face covering mask. In one embodiment, the spring wire support is a cage or ring mount. In a second embodiment, the spring wire support is a base mount and uses a pair of spring-biased opposing arms to positively yet releasably engage an interior portion of the full face mask. Both embodiments facilitate the positioning of user specific eyewear in a variety of face masks and particularly in full face masks.

BACKGROUND OF THE INVENTION

It is quite common in a number of situations for a person to be required to wear a gas mask or full face respirator. Firefighters, chemical workers, police officers in certain situations, hazardous material disposal personnel and the like are only a few examples of the wide range of people who must wear a full face respirator or gas mask during at least a portion of their working day. Such full face respirators or gas masks typically include a wraparound clear plastic lens that is supported in a soft, pliable silicone facepiece. While other styles of full face respirators and gas masks are available on the market, the typical configuration is as described above.

A substantial number of the people whose work environment requires the use of such a full face respirator or gas mask are also required to wear some type of corrective lenses because of visual limitations. In a normal situation, such as in a non-hazardous environment, many of these visually challenged workers would rely on contact lenses or on eyeglasses which are provided with generally well-known side pieces.

Many people however, cannot wear contact lenses for a variety of reasons. As a result, many users of full face respirators or gas masks often do not use contact lenses when they are wearing these full face masks. Instead, they rely on more conventional spectacles.

A full face mask will typically have its soft, pliable facepiece, fabricated of silicon or the like, define a seal around the wearer's eyes, nose and mouth. That seal typically depends on a positive contact between the soft, pliable material of the facepiece and the skin of the wearers. Facial hair, such as a beard, is apt to compromise the ability of the facepiece to form a positive, leakproof seal. For that reason, most full face masks do not cover the wearer's ears. To do so would require, on most wearers, that a seal be made against the wearer's scalp which is typically covered with hair.

As is well known, conventional eyeglasses include side pieces that extend from the lens frame of the eyeglasses, across the temples of the wearer and which attach about the wearer's ears. These side pieces would thus have to pass under the edge of the facepiece and would therefor compromise the seal integrity of the facepiece.

The assignee of the subject application, Mine Safety Appliances Company ("MSA"), of Pittsburgh, Pa., is a supplier of a large number of full face respirators and gas masks. They are also the assignee of U.S. Pat. No. 3,563,640, which is directed to a device for holding spectacles in a mask. That patented device has been commercialized in an MSA Spectacle Kit which has been widely sold and used. As may be seen in that patent, the device for holding spectacles is a mount including a spring wire with a central downwardly extending loop that supports a friction member. The friction member is configured to support a spectacle frame and the spring wire is adapted to be secured in a channel or groove that defines the juncture between the wraparound lens and the facepiece.

While this prior MSA device has enjoyed substantial commercial success, it has been determined that the prior spectacle holding device does not provide as much stability, in the mounting of the eyeglasses, as may be required for certain use applications. A number of wearers of full face masks engage in rather strenuous activities. Firefighters are a group of users of full face respirators or gas masks who, in the course of their occupational activities, engage in running, jumping and other similar activities where it is imperative that the spectacle holding and mounting device must be able to retain the spectacles in their intended position. Lenses for eyeglasses are ground based on a distance from the lens to the user's eye. If that distance varies by too great an amount, the user's vision is impaired. Eyeglass lenses are also ground or formed so that their optical centers will be aligned with the wearer's pupils. If the eyeglasses shift or are dislodged, so that the optimum alignment is compromised, the vision of the user will again be degraded.

It will thus be appreciated that there is a need for improved devices for holding eyeglasses or spectacles in a full face respirator or gas mask. The spectacle frame mount, in accordance with the present invention, overcomes the limitations of the known devices and is a substantial advance in the art.

SUMMARY OF THE INVENTION

The present invention provides a spectacle mount for a full face respirator or gas mask that is adaptable to various configurations of full face respirators and gas masks. The present invention also provides a mount for spectacles in a full face respirator or gas mask that provides a secure support for the supported spectacles and that properly positions the eyeglasses within the facepiece for proper vision. Preferably the spectacle frame mount of the present invention is compatible with prior spectacle frame support blocks.

In accordance with the present invention, as will be discussed in greater detail in the description of preferred embodiments that is provided subsequently, the spectacle frame mount for a full face mask, such as a respirator or a gas mask, includes a spectacle support block that is supported by a resilient spring wire mount. The spring wire mount is configured, in a first embodiment, as a cage or ring support that aligns in a channel which is formed by the interface between the wraparound lens and the resilient face mask of the full face mask. In a second preferred embodiment, the spring wire is configured as a spreadable or base clamp that is sized to use the mouth or nose region of the full face mask as its point of attachment. In both embodiments, the inherent resilience or spring of the spring wire is able to positively secure the spectacles in the full face mask.

The spectacle frame mount in accordance with the present invention is, as was the case with the device shown in U.S. Pat. No. 3,563,640, totally containable within the inner portion of the resilient facepiece of the mask or respirator. There are no spectacle side pieces that pass out of the facepiece. There is thus no possibility of air or gas ingress or egress. The spectacle frame mount of the present invention thus does not compromise the efficacy of the full face respirator or gas mask with which it is to be used.

In both embodiments of the spectacle frame mount, in accordance with the present invention, the resilient spring wire is configured to provide a positive securement of the eyeglasses frame to the facepiece. This insures that the spectacle frame is not dislodged or jarred out of alignment, even during times of rough usage of the full face respirator or gas mask. Since the spring wire mount is configured, in accordance with the present invention, to provide this positive securement, it is suitable of use by firefighters, public safety officials, industrial workers, military service personnel and others who are apt to subject their equipment to hard usage. The known devices were more susceptible to dislodgement. The present invention, however, in both embodiments, overcomes this limitation.

In the cage or ring configuration of the spectacle frame mount, in accordance with the present invention, the spring wire has two free ends that are retained adjacent each other in an encompassing sleeve or termination device. That sleeve or termination device, with the two ends of the spring wire positioned in it in an overlapping or overlying configuration, acts as a leaf spring. The result is that the cage or ring spectacle frame mount is self-tensioning and, as discussed, above, is adaptable to a variety of wraparound lens assemblies of various full face masks.

The base or spreadable mount of the second embodiment of the spectacle frame mount, in accordance with the present invention, also utilizes the spring force of the spring wire to insure a positive connection of the spectacle frame mount to the interior of the full face mask. The spreadable sections of the spring wire are opposed to each other and cooperate, like the jaws of a pair of pliers, to positively engage the nose/mouth piece of the facepiece of the mask. The ends of the spring wire are again situated in close proximity to each other in the use position. Again, this positive engagement securely positions the spectacle frame in place in the full face mask so that it will not be displaced by jolts or jars to which the respirator or gas mask may be subjected.

The spectacle frame mount in accordance with the present invention provides a positive, secure positioning of spectacle frames in a gas mask or full face respirator and is a significant advance in the art.

BRIEF DESCRIPTION OF THE DRAWINGS

While the novel features of the spectacle frame mount in accordance with the present invention are set forth with particularly in the appended claims, a full and complete understanding of the invention may be had by referring to the detailed description of the preferred embodiments, as set forth subsequently, and as depicted in the accompanying drawings, in which;

DESCRIPTION OF THE PREFERRED EMBODIMENTS

Figure 1:
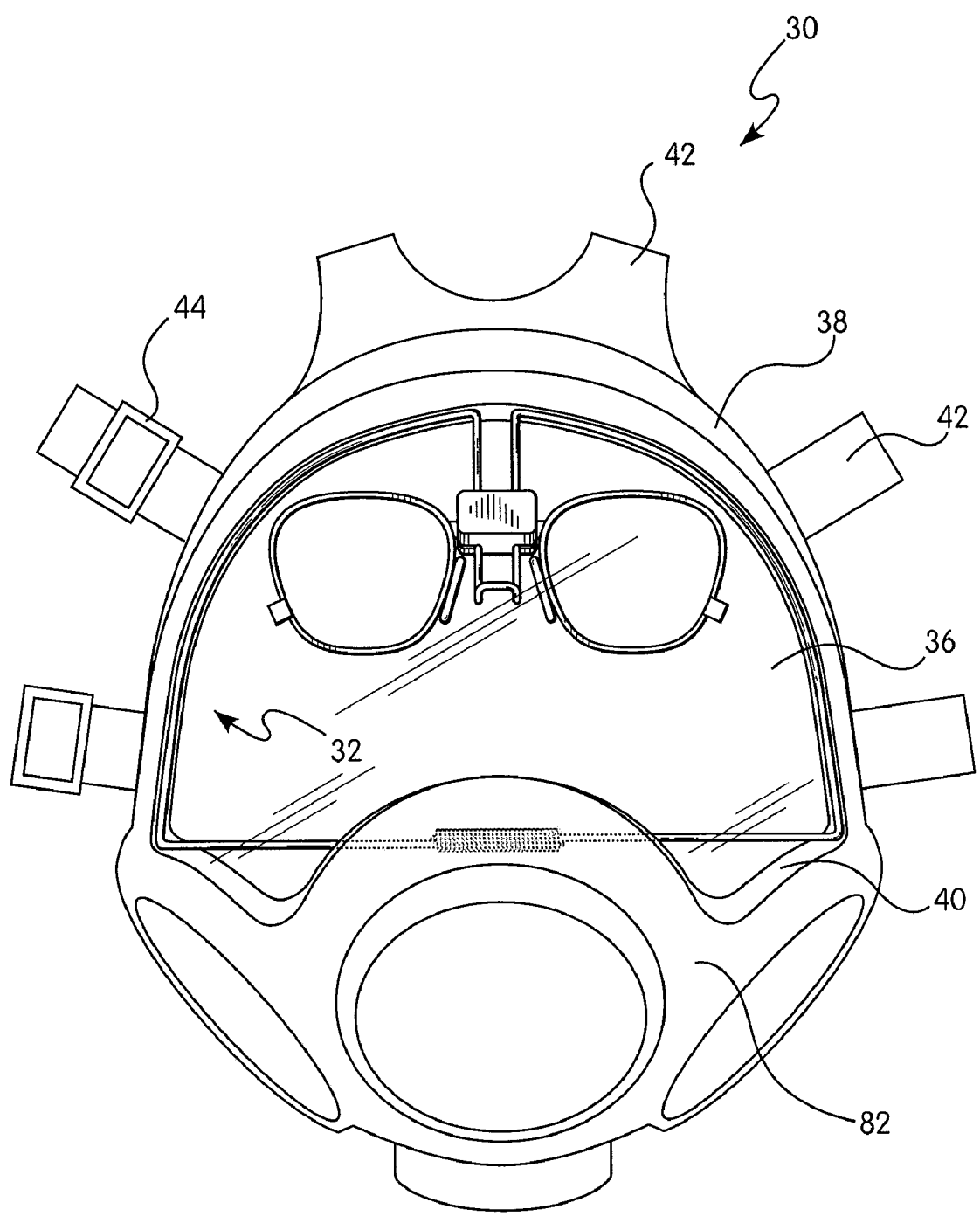
FIG. 1 is a front elevation view of a full face mask having positioned therewithin a first preferred embodiment of a spectacle frame mount in accordance with the present invention.

Referring initially to FIG. 1, there may be seen, generally at 30 a full face respirator or gas mask, hereinafter a full face mask, in which there is positioned a first preferred embodiment of a spectacle frame mount, generally at 32, in accordance with the present invention. This first preferred embodiment of spectacle frame mount, generally at 32 is seen in more detail in FIGS. 3-14, all of which will be described in greater detail subsequently. A second preferred embodiment of a spectacle frame mount in accordance with the present invention is shown, generally at 34, in FIGS. 15-17. While the second preferred embodiment, generally at 34, is not itself depicted in conjunction with a full face mask 30, it will be indicated that both embodiments of the spectacle frame mount, in accordance with the present invention, are specifically intended to be used in conjunction with, and to be supported in the interior of a suitable full face mask, generally at 30.

Figure 2:
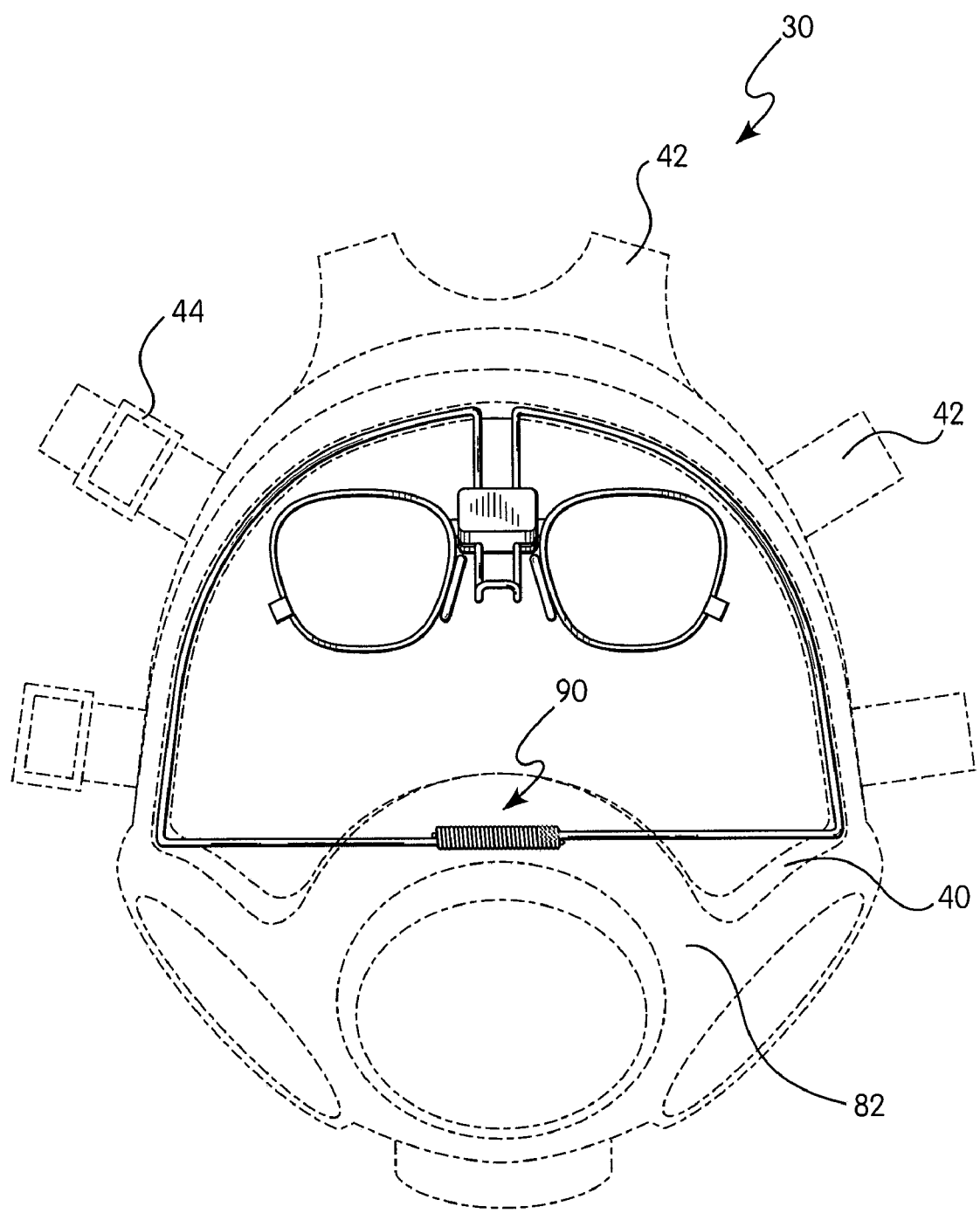
FIG. 2 is a view similar to FIG. 1 and showing the full face mask in dashed lines.

As was mentioned previously, MSA, the assignee of the subject application, is a manufacturer and seller of a wide variety of full face respirators and gas masks, the full face mask depicted at 30 in FIG. 1 being a schematic representation of a number of such devices. As may be seen in FIG. 1, and as also shown in FIG. 2, full face mask 30 indicates an encircling or wraparound lens 36 which is secured in a soft, pliable facepiece, generally at 38. Facepiece 38 is typically fabricated of silicone or of another similar inert material which is impervious to hostile environments and which will form a secure positive seal with the face of a wearer. As seen in FIGS. 1 and 2, a channel or juncture 40 is formed where the edges of the wraparound lens 36 are embedded in the facepiece. The full face mask, generally at 30, is secured to the wearer's head using an arrangement of straps and/or bands as is known in the art. These bands or straps are depicted schematically at 42 in FIGS. 1 and 2 Suitable buckles or tightening devices for these straps are shown at 44 in FIGS. 1 and 2.

Figure 3:
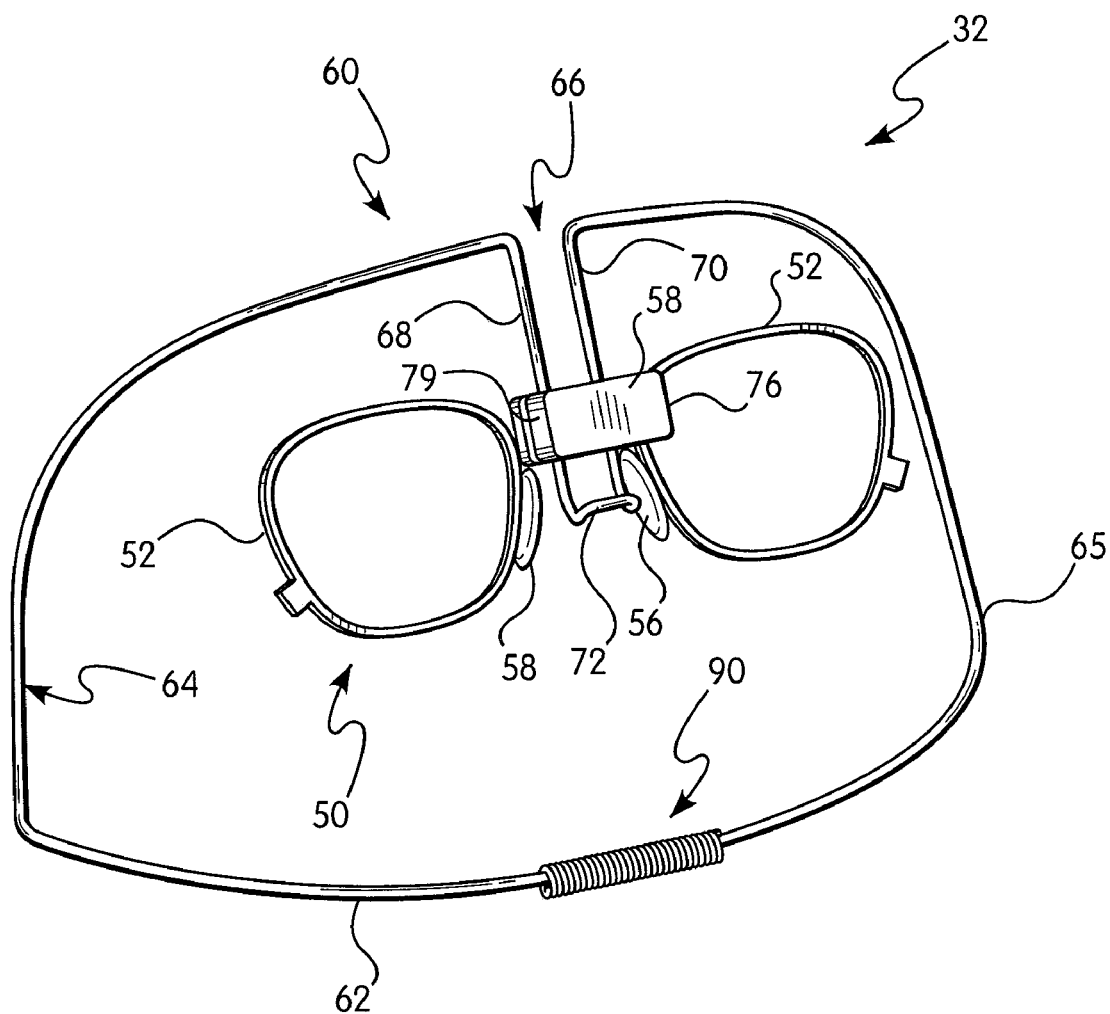
FIG. 3 is a perspective view of a first preferred embodiment of the spectacle frame mount in accordance with the present invention.
Figure 4:
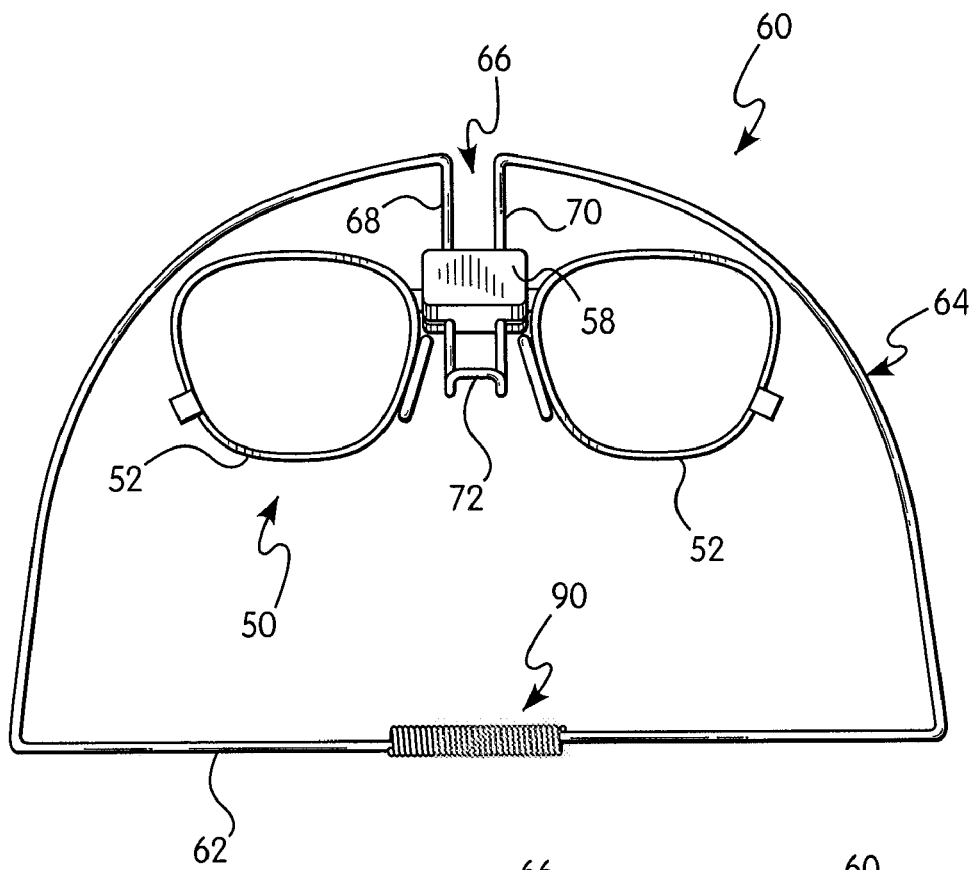
FIG. 4 is a front elevation view of the spectacle frame mount of FIG. 3.
Figure 5:
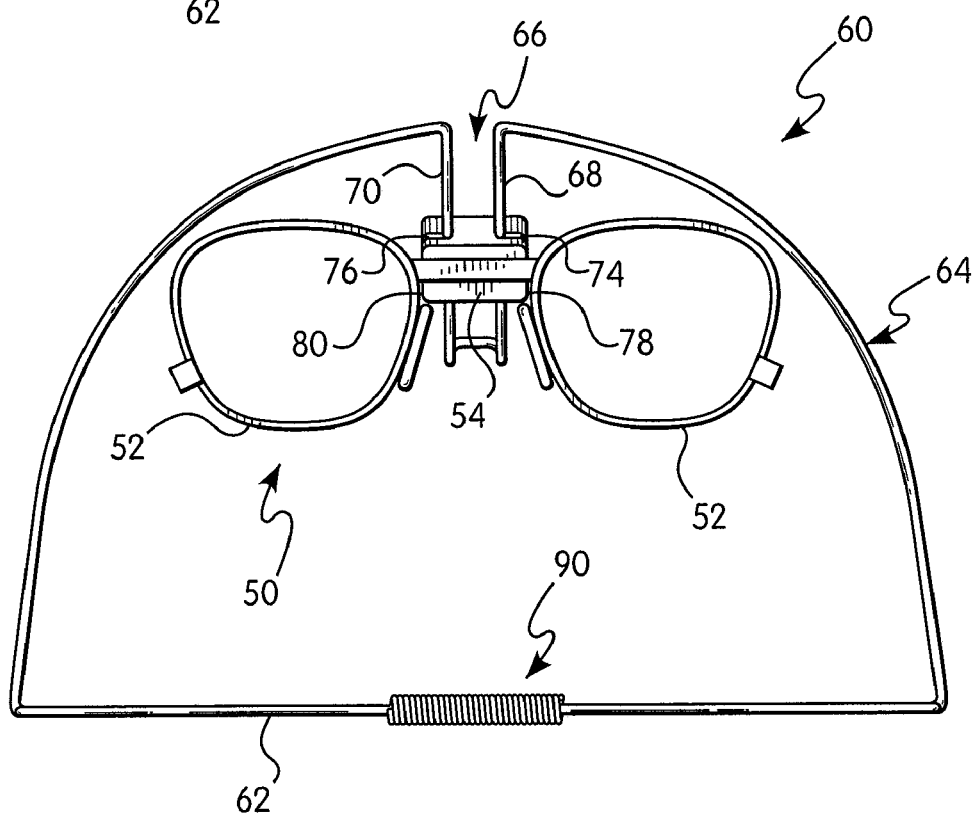
FIG. 5 is a rear elevation view of the spectacle frame mount of FIG. 3.
Figure 6:
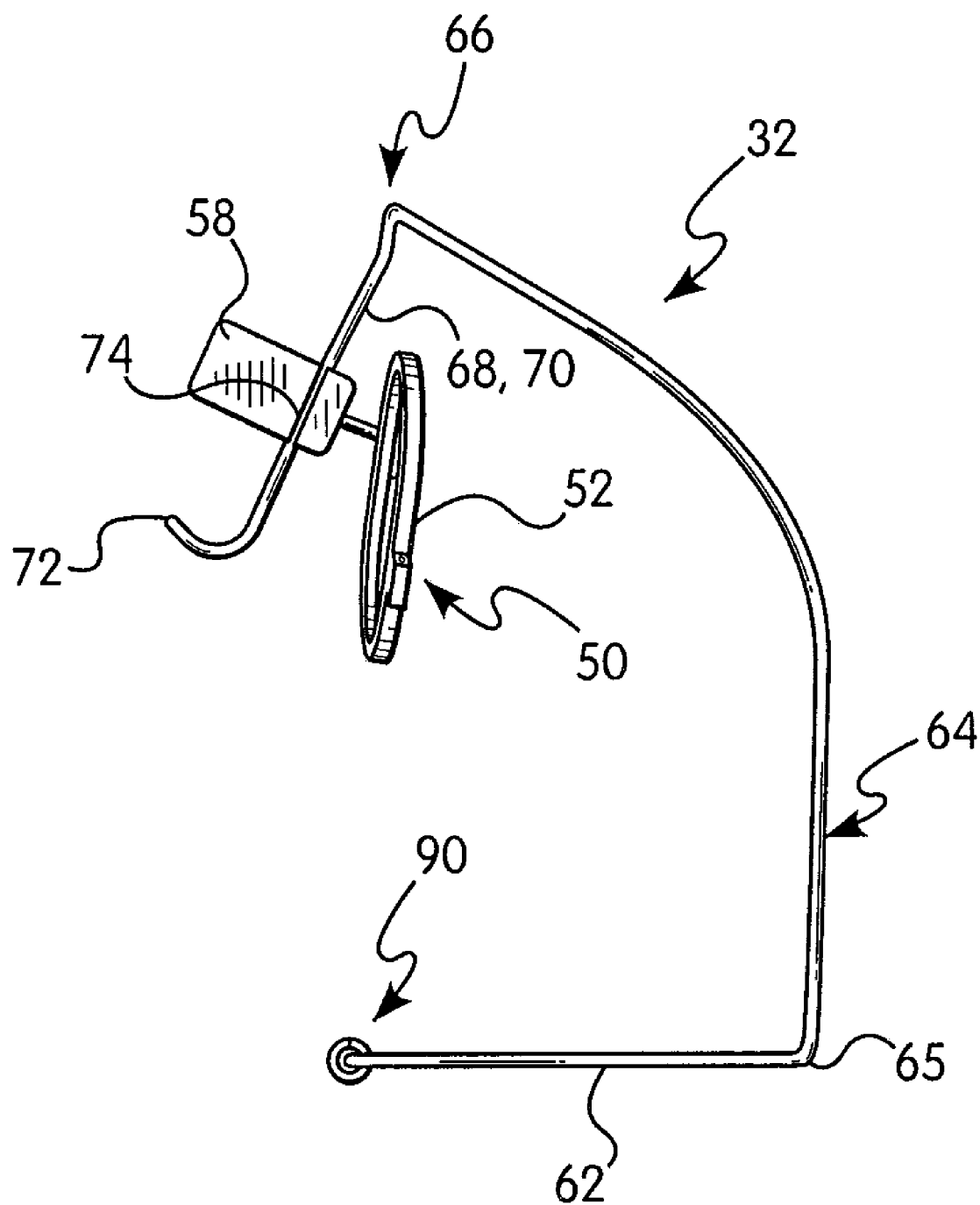
FIG. 6 is a side elevation view of the spectacle frame mount of FIG. 3.
Figure 7:
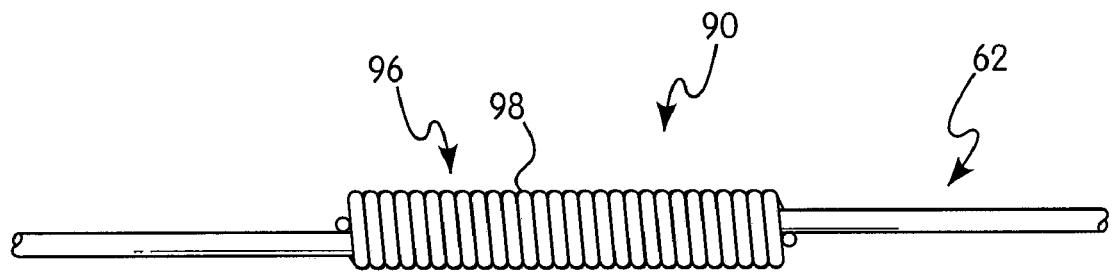
FIG. 7 is a side elevation view of a first embodiment of a termination of the spring wire ends of the cage or ring spectacle frame mount of the first preferred embodiment.
Figure 8:
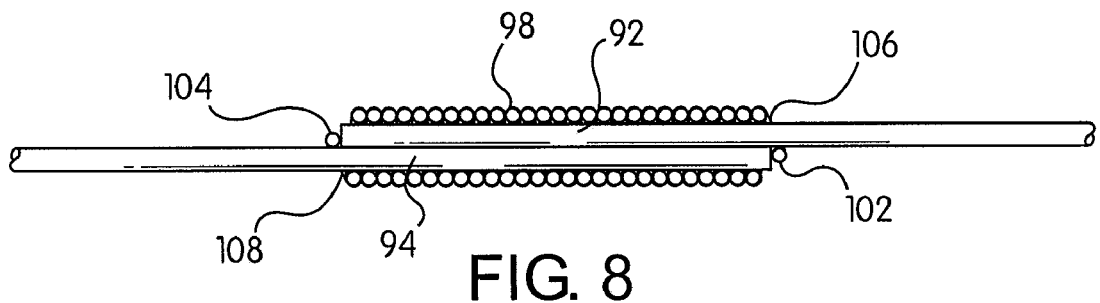
FIG. 8 is a view similar to FIG. 7 and partially in cross-section.

Turning now to FIG. 3, there is shown a perspective view of a first preferred embodiment of the spectacle frame mount, generally at 32, in accordance with the present invention. The spectacle frame mount 32 is usable to position and to support a spectacle frame, generally at 50, and which is comprised of a pair of lens holders 52, a crosspiece or bridge 54 (as seen in FIG. 5) and a pair of nosepieces 56, A friction block 58, which is typically made of rubber or the like is glued or otherwise attached to the bridge 54 intermediate the two spaced lens holders 52. It is to be noted that the spectacle frame, generally at 50, is devoid of side pieces so that it cannot be comfortably worn by a user by itself; i.e. it needs a mounting assembly to hold it in place in a use position.

The first embodiment of the spectacle frame mount, generally at 32, in accordance with the present invention, as seen in FIG. 3, provides a mount for the spectacle frame 50 in the form of a ring or cage mount, generally at 60. The cage or ring mount 60 is configured of spring wire and has an overall shape of a ring or a declined D, as seen most clearly in FIGS. 4 and 5. The spring wire ring mount, generally at 60, is complementary in shape, to the shape of an interior surface of the wraparound lens 36. As such, ring or cage mount 60 has an arcuate base 62 and a generally semi-circular or bowed top 64. A generally right angle, sharp bend 65 is formed in each leg of the spring wire and separates the upper bowed top section 64 and the lower arcuate base section 62 of each portion of the spring wire forming the cage or ring mount 60.

A central, downwardly extending, upwardly opening loop, generally at 66, is formed in the spring wire ring or cage mount 60 and extends downwardly or generally radially into the interior of the cage mount 60. The loop 60 includes a pair of loop side pieces 68; 70 and a transverse bar 72. Loop 66 is equidistant the two ends of the spring wire and divides the spring wire into two portions. As may be seen most clearly in FIG. 6, the loop 66 is inclined somewhat forwardly, as well as downwardly, and the transverse bar 72 projects forwardly at the loop side pieces 68; 70. The forward projection of the loop, generally at 66, will be such that when the friction block 58 is attached to the loop side pieces 68; 70, the spectacle frame 50 will be properly oriented to align with the bridge of the nose of a wearer of the full face mask 30. The transverse bar 72 is intended not to exert a significant force against an interior surface of the wraparound lens 36 of the full face mask, generally at 30, when the first preferred embodiment, generally at 32 of the spectacle frame mount, in accordance with the present invention, is placed within the full face mask, generally at 30.

The friction block 58 is provided with spaced passages, generally at 74 and 76. These passages 74 and 76 extend generally vertically along the two sides 78, 80 of the friction block 58. They are sized so that they will retentively receive the loop side pieces 68 and 70. As is seen in FIGS. 3-6, the length of the two loop side pieces 68 and 70 is longer than the sides 78 and 80 of the friction block 58 The result is that the spectacle frame 50 can be slid up or down along the loop side pieces 68; 70 to properly position the spectacle frame 50 to the wearer, once the ring or cage-shaped mount 60 is situated in the full face mask 30.

As is depicted in FIGS. 1 and 2, the overall shape of the cage or ring mount, generally at 60 is selected so that it will fit within the confines of a typical full face mask 30. The bowed top or upper section 64 of each spring wire portion engages the channel 40 and the arcuate base or lower section of each spring wire portion 62 traverses the width of the wraparound lens 36 generally at the level of a nose cup or a mouth cup, generally at 82. The use of spring wire to form the cage or ring-shaped mount 60, together with the overall shape of the cage or ring mount 60, renders the cage or ring mount 60 adaptable to a variety of full face masks. In accordance with the subject invention, this adaptability is increased by providing a termination device, generally at 90 in the arcuate base 62 generally at a midpoint in that arcuate base 62 and generally beneath the downwardly extending loop 66. The spring wire termination device generally at 90 receives the two spring wire ends and positions them adjacent each other.

Referring now to FIGS. 7-14, there are depicted two embodiments of a wire termination device, generally at 90, in accordance with the present invention. The arcuate base, generally at 62, of the lower section of the ring or cage mount 60 has two spring wire ends 92 and 94. These two spring wire ends 92 and 94 are receivable, in an overlying or overlapping arrangement, in a sleeve 96 that may be configured as a coil spring 98, as depicted in FIGS. 9-12, or as a coil spring 98 encased in a plastic sheath 100, as depicted in FIGS. 13-16.

Figure 9:
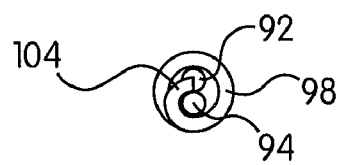
FIG. 9 is a left end view of the spring wire termination device of FIG. 7.
Figure 10:
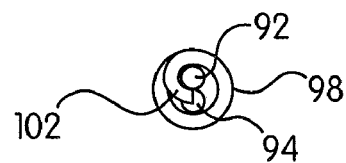
FIG. 10 is a right end view of the device of FIG. 7.
Figure 11:
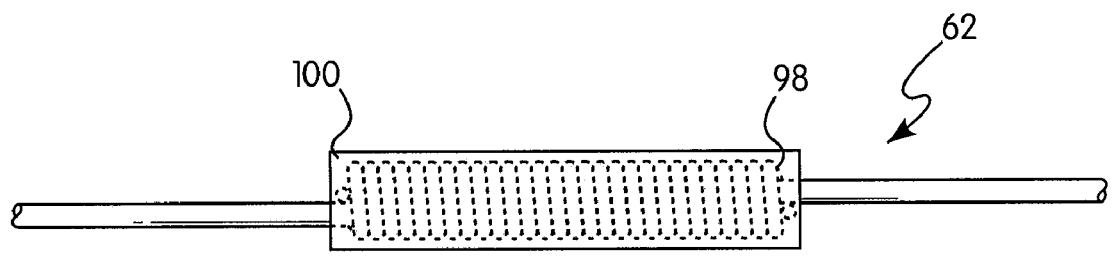
FIG. 11 is a side elevation view of a second embodiment of a termination of the spring wire ends of the first embodiment of the cage or ring spectacle frame mount.

Sleeve, generally at 96 is sized so that the two spring wire ends 92 and 94 can overlie or overlap each other, and can slide laterally with respect to each other, while remaining in the confines of the sleeve 96. The coil spring 98 has a lower coil end 102 at the right of the spring, as depicted in FIGS. 9 and 10, and an upper coil end 104 at the left of the spring 98. It will be understood that the description of one of these offset spring ends as a lower end 102 and the other as an upper end 104 is a relative term. The two coil spring offset ends 102 and 104 define reduced diameter openings 106 and 108 at the two ends of the coil spring 98. Each reduced diameter opening 106; 108 is adapted to selectably receive one of the spring wire ends 92 or 94. The opposed offset coil spring ends 102 and 104 prevent through passage of the two spring wire ends 92 and 94. Thus, the two spring wire ends 92 and 94 can slide relative to each other in the confines of the coil spring 98. However, the minimum diameter of the ring or cage-shaped mount 60 is limited by the abutment of the spring wire ends 92 and 94 of the arcuate base 62 against the offset ends 102 and 104 of the coil spring 98 of the termination device 98.

The spring wire which is used to form the ring or cage mount, generally at 60 in accordance with the first preferred embodiment of the present invention, has a certain inherent resiliency. That resiliency, in combination with the bowed top or upper section 64 of the mount 60, as well as the resiliency imparted by the downwardly extending, upwardly opening loop 66 will tend to increase the length of the arcuate base or lower section 62 of cage or ring mount 60. The length of the termination device 90 and specifically of the coil spring 98 is selected so that the two ends 92; 94 of the spring wire will not pull out of the coil spring 98 Typically, they will also not be apt to abut the two offset coil ends 102 and 104. The two spring wire ends 92 and 94 will thus overlie and overlap each other, but not to the extent depicted in FIG. 10 which may be viewed as a depiction of the wire termination device in the mount reduced diameter configuration, such as when the ring or cage mount is being placed inside the facepiece 38 of the full face mask 30. Since the termination device, generally at 90 is a coil spring 98, its length could increase by the exertion of pressure on the coil ends 102 and 104 by the spring wire ends 92 and 94 if the diameter of the arcuate base 62 had to be reduced even further for placement of the ring or cage mount 60 into a full face mask 30.

The two spring wire ends 92 and 94 overlie and overlap each other within the termination device 90 and effectively act in the manner of a leaf spring. That leaf spring capability, in combination with the use of a coil spring 98 at the body of the termination device 90, provides a desired ability of the arcuate base 62 of the ring or cage-shaped mount 60 to curve or deflect, as needed, to accomplish a secure stable mounting of the cage or ring mount 60 in the interior of the facepiece 38 of the full face mask 30. The coil spring 98 can be deformed, at least temporarily, both longitudinally, in the direction of the arcuate base 62 and transversely, in or opposite to the direction of the bowed top 64, to accomplish the function of adjusting the transverse length of the ring or cage-shaped mount 60 to the width of the wraparound lens 36 of the full face mask 30. The ability of the two overlapping spring wire ends 92 and 94 to move longitudinally, with respect to each other, also increases the ability of the arcuate base 62 to snugly fit into the space in the full face mask 30.

Figure 12:
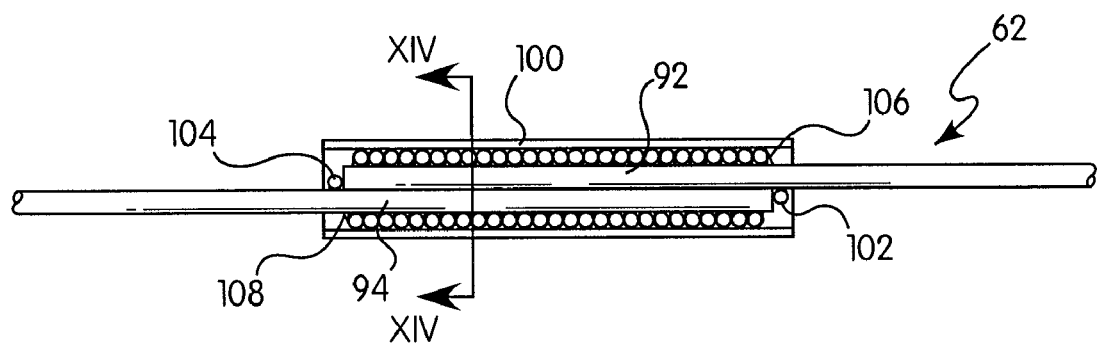
FIG. 12 is a view similar to FIG. 11 and partially in cross-section.
Figure 13:
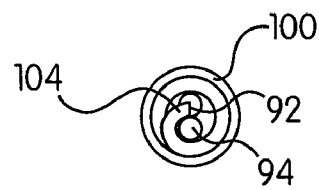
FIG. 13 is a left end view of the device of FIG. 11.
Figure 14:
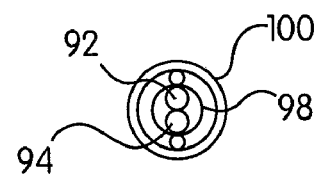
FIG. 14 is a sectional view of the device of FIG. 11 taken along line XIV-XIV of FIG. 12.

As may be seen in FIGS. 11-14, a protection sheath 100 may be placed over the coil spring 98 of the termination device 90. The purpose of the sheath 100 is two-fold. It will serve to protect the wraparound lens 36 from any scratches that might be caused by contact of the termination device 90 with the lens 36. Sheath 100 can also act to stabilize the coil spring 98 so that it is less apt to deflect laterally, or if it does deflect laterally, will be caused to return to its cylindrical orientation, as depicted in FIG. 12, for example.

The protection sheath 100 may be made of a suitable plastic or other non-abrasive material. It can be slid over the coil spring 98 and could, if desired, be heat shrunk into place. Alternatively, it could be glued or otherwise adhered to the outer surface of the coil spring 98.

In an alternative embodiment, which is not specifically depicted, the functions of the coil spring 98 and of the protective sheath 100 can be combined by providing the termination device 90 as a plastic sleeve. In such an embodiment, the ends of the plastic sleeve would need to be constricted to allow passage of one of the spring coil ends 92; 94 but not both of the spring wire ends. Thus, the plastic sleeve would be the functional equivalent of both the coil spring 98 and the protective sheath 100.

Figure 15:
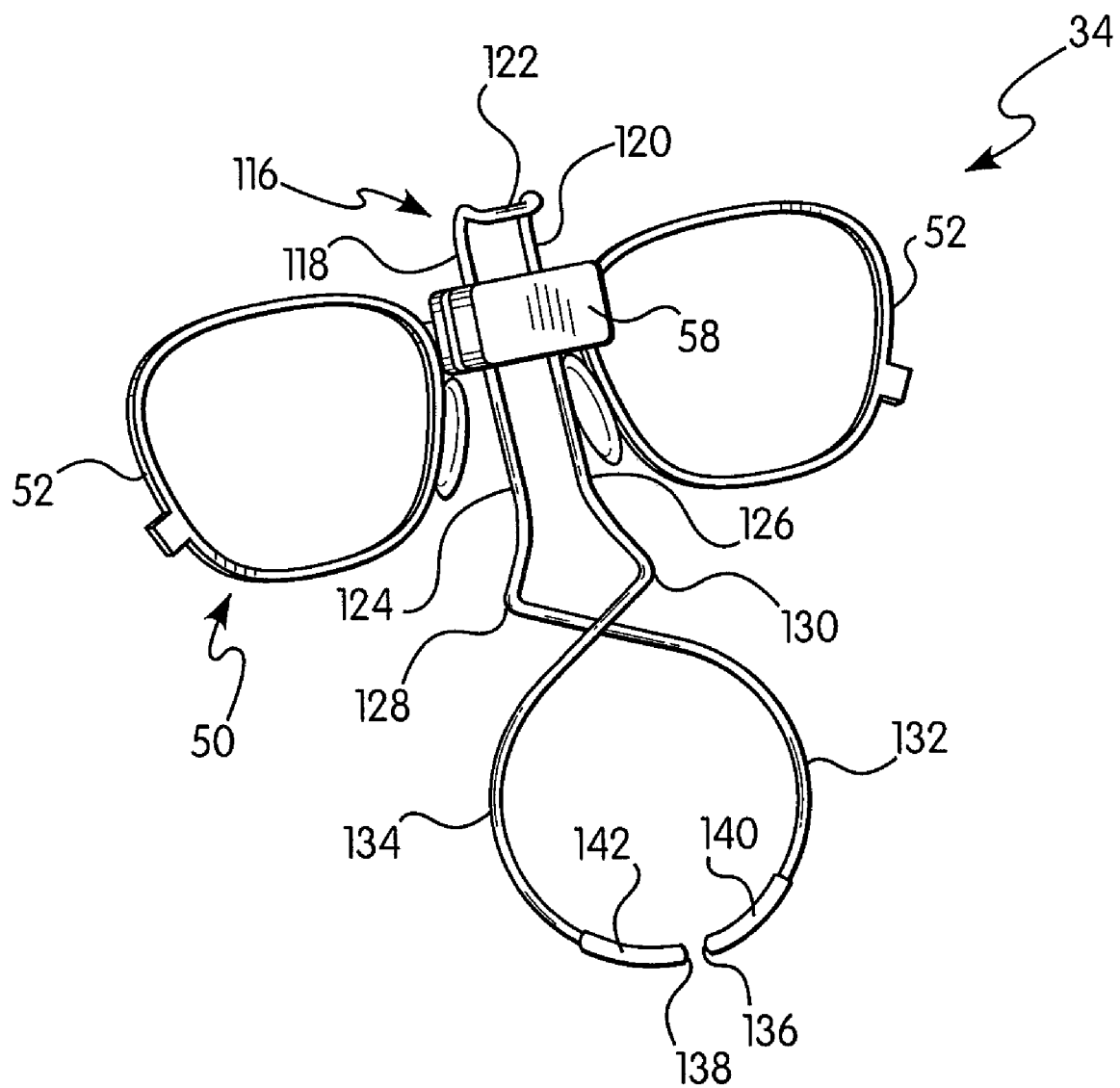
FIG. 15 is a perspective view of a second preferred embodiment of a spectacle frame mount in accordance with the present invention.
Figure 16:
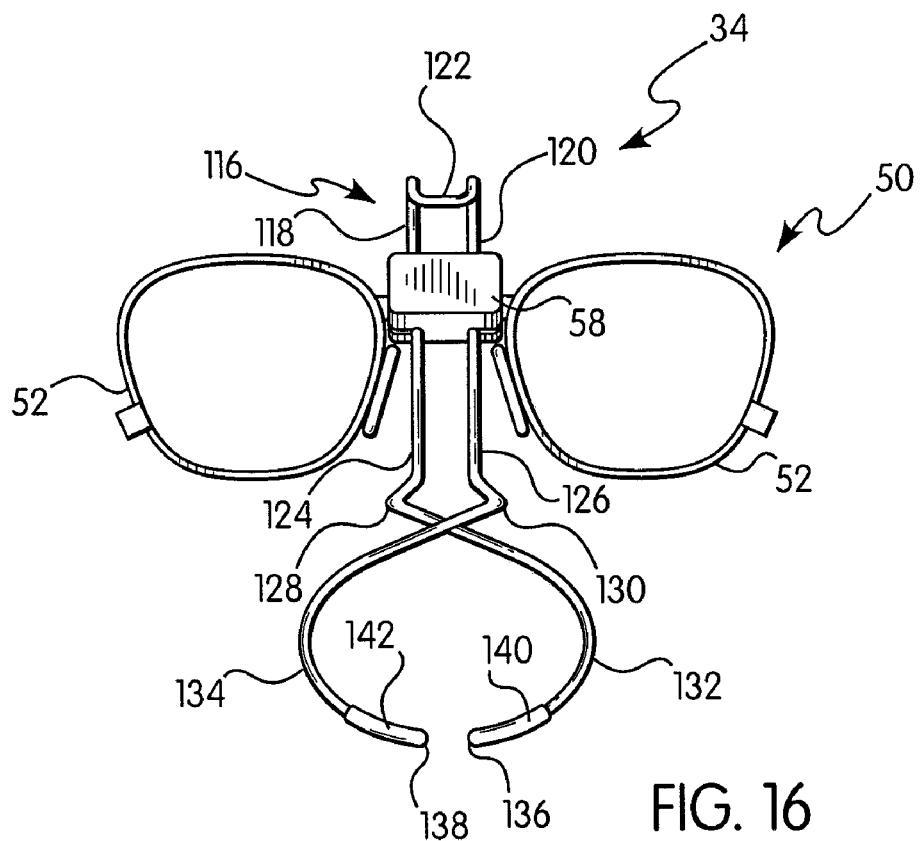
FIG. 16 is a front elevation view of the spectacle frame mount of FIG. 15.
Figure 17:
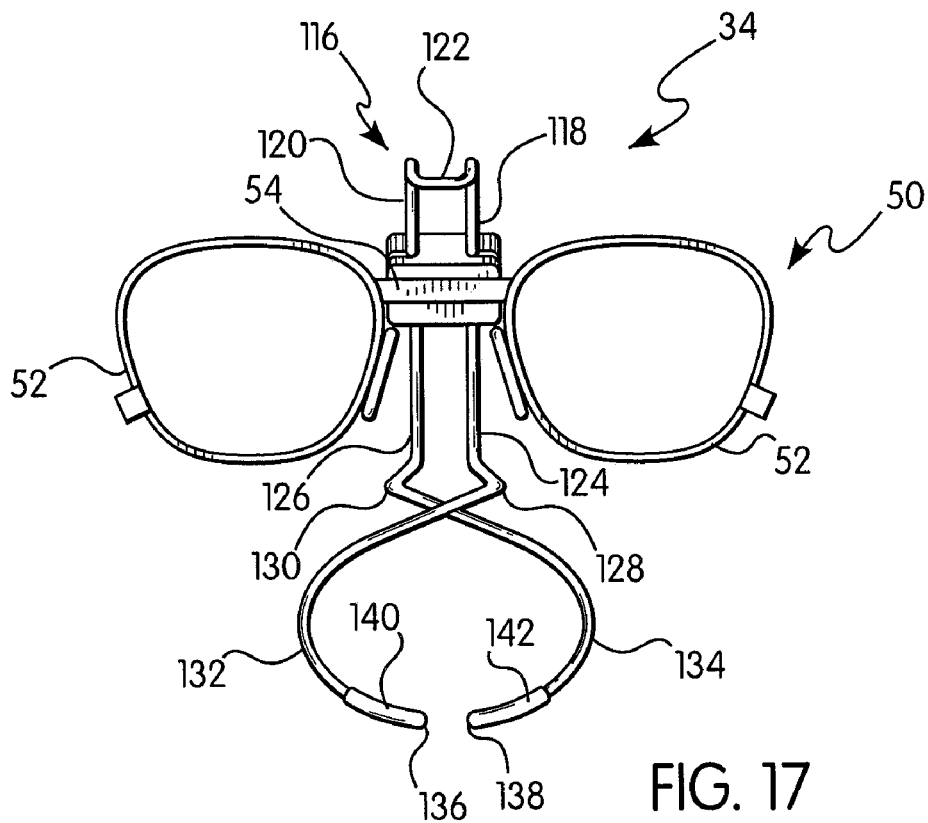
FIG. 17 is a rear elevation view of the spectacle frame mount of FIG. 17.

Referring now primarily to FIGS. 15-17, a second preferred embodiment of a spectacle frame mount, generally at 34, is depicted in detail. The second preferred embodiment will be referred to, in the following discussion, as a base mount to distinguish it from the ring or cage mount 32, as has been discussed above. Base mount 34 is the same, in its intended function as the ring or cage mount 32. Both are intended to support a spectacle frame, generally at 50, in the interior of a full face mask, generally at 30.

Base mount 34, as seen in FIG. 15, is also constructed of a suitable spring wire, as was the ring or cage mount 32. The spring wire has internal resiliency and will return to an original shape, if all external forces are released. In the base mount embodiment 34, the spectacle frame 50, which is to be supported, is the same as the spectacle frame 50 which is supported by the ring or cage-mount 32. Like reference numerals will be used to identify like components in both of the two embodiments.

In the base mount 34, as seen in FIG. 15, the orientation of the loop 66 of the ring or cage mount 32 is reversed and the loop, which is now referred to as an upwardly extending, downwardly opening loop 116 has a pair of loop side legs 118 and 120. These side legs 118 and 120 are connected by an upper transverse bar 122. The transverse bar 122 is generally horizontal when the base mount 34 is situated in the interior of the full face mask 30. However, the two loop side legs 118 and 120 now extend downwardly, as opposed to upwardly, as is the case in the ring or cage mount 32 of the first embodiment. The spectacle frame 50 is provided with the same friction block 58 which is connected to the spectacle frame bridge 54 and which has the same passages 74; 76 that are usable to position the spectacle frame 50 on the upwardly extending loop 116 for precise adjustment of the spectacle frame 50 along the two equidistantly spaced loop side legs 118; 120.

In the base mount embodiment of the spectacle frame mount, generally at 34, in accordance with the present invention, the mount is identified as a base mount because it is connectable to a base portion of the full face mask 30. As seen in FIGS. 1 and 2, such a base portion of mask 30 can be the nose cup 82 or mouth cup. Such a base portion 82 of the full face mask 30 is present in virtually all full face masks. While its specific configuration may vary slightly from one mask to another, the presence of the base portion 82 of each such mask, and its overall shape, will be sufficiently uniform, from mask to mask, to be usable with the base mount 34 of the subject invention.

Referring again to FIG. 15, the base mount 34 utilizes a generally pincers-like or scissor-like structure to engage with a base portion 82 of a full face mask 30. Each of the loop side legs 118 and 120 or portions has an elongated, generally straight upper section 124; 126 which, as seen in FIG. 15 depends below the level of the friction block 58 of the spectacle frame 50. The two upper leg sections 124; 126 flare outwardly to a midpoint bend 128, 130 which is generally a right angle bend. Below each such midpoint bend, each of the loop side leg portions is shaped as a generally semi-circular lower leg section 132; 134. Since the base mount, generally at 34 is a scissors or pliers like mount, the two lower leg sections 132; 134 cross each other just below their respective midpoint bends 128; 130, respectively. The two semi-circular lower leg segments each terminate in a leg tip 136; 138. These two leg tips 136; 138 will be proximate to each other in an unstressed, non-use position of the base mount 34. Each such tip 136, 138 is preferably provided with a friction enhancing cover 140; 142. As may be seen in FIG. 15, the two semi-circular lower leg sections 132 and 134 define a generally circular opening which is sized to be engageable about a base portion 82, such as a nose cup or a mouth cup of a typical full face mask 30.

The base mount 34 in accordance with the second preferred embodiment of the spectacle frame mount of the present invention is, as was discussed above, constructed of a suitable spring wire which is formed into the generally scissors or pliers shape shown in FIG. 15. The resilient friction block 58 serves, in the second embodiment, the function of a fulcrum or a pivot point for the two loop side legs below that friction block 38. The horizontal or transverse loop bar 122 also acts to maintain the positioning of the two legs, as depicted in FIG. 17. In use, the two leg upper sections 124, 126 are grasped by the user and are pushed together. This will spread apart the two lower leg sections 132 and 134, and their respective tips 136; 138, and will increase the diameter of the generally circular opening defined by the two lower leg sections 132, 134 in a manner akin to opening a pair of pliers or a pair of scissors. With the two legs in this position, the base mount's lower leg sections 132, 134 can be slid into engagement with the base portion 82 of a full face mask. Once the lower leg sections 132, 134 have been so positioned, the two leg upper sections 124; 126 can be released. This will allow the two lower leg sections 132; 134 to move back towards their non-flexed positions, as depicted in FIG. 15. It will be understood that the return of the lower legs 132, 134 to that position will be limited by the overall size of the full face mask base portion 82. The inherent resiliency of the spring wire used to fabricate the base mount 34, together with the gripping force, exerted by the two lower side legs 132; 134 will be effective in mounting the base mount 34 embodiment of the spectacle frame mount, in accordance with the present invention, to securely engage and to be retained on the base portion 82 of the full face mask 30.

Both embodiments of the spectacle frame mount, in accordance with the present invention, are usable to securely, yet removably position the selected spectacle frame 50 in a proper orientation in the interior of the full face mask 30 and in proximity to the wraparound lens 36. This positioning must be positive and secure so that the initial positioning of the spectacle frame 50 will be maintained during rough handling and rough usage of the full face mask. It is of upmost importance that the two embodiments of the spectacle frame mount, in accordance with the present invention, maintain the spectacle frames 50 in their proper position. If they do not, the spectacle frames will be displaced and the user's vision will be adversely affected.

Each of the two preferred embodiments of the spectacle frame mount, in accordance with the present invention, has been subjected to rigorous testing by the assignee of the subject application. These tests included drop tests, tumble tests and rough handling tests. In the drop test, a full face mask, with the spectacle frame mount in place, is dropped from a height of 6 feet, in various initial orientations. The spectacle frame mount must remain in place. In the tumble test, the full face mask, with the spectacle frame mount in place, is tumbled in a rotating cage for 20 minutes. Again, the spectacle frame mount must stay in place. In the rough handling test, a full face mask, with the spectacle frame mount in position, is placed on a vibrating table for 20 minutes at 300 cycles/minute. The spectacle frame mount must remain in place. Both embodiments of the spectacle frame mount in accordance with the present invention passed these test with only minimal movement. It was thus determined, on the basis of these tests that the two embodiments of the spectacle frame mount, in accordance with the present invention, perform their function of mounting the spectacle frame in its use position in a full face mask while that mask is subjected to various drops, tumbles and rough handling, typically of a more severe nature than will be encountered in daily use. Thus the two embodiments of the spectacle frame mount, in accordance with the present invention, provide a stable, yet removable mount for a spectacle frame in a full face mask.

While preferred embodiments of a spectacle frame mount in accordance with the present invention have been set forth fully and completely hereinabove, it will be apparent to one of skill in the art that various changes in, for example, the specific type of spectacle frames to be mounted, the type of friction enhancing leg tip cover, the material used for the friction block, and the like could be made without departing from the true spirit and scope of the present invention which will be limited only by the appended claims.

What is claimed is:

1. A spectacle frame mount usable to position a spectacle frame in a face mask comprising:
   a spring wire having a first end and a second end;
   a loop in the spring wire intermediate the first and second ends, the loop being positioned in the spring wire generally equidistant the first and second ends and dividing the spring wire into first and second spring wire portions;
   an upper section and a lower section in each of the first and second spring wire portions; and
   a bend in each spring wire portion between the upper section and the lower section of each spring wire portion, the first and second ends of the spring wire being positioned adjacent each other.

2. The spectacle frame mount of claim 1 wherein the loop includes first and second loop sides connected by a loop transverse bar.

3. The spectacle frame mount of claim 2 wherein the loop is upwardly opening.

4. The spectacle frame mount of claim 3 wherein the first and second spring wire ends are generally horizontal and overlapping.

5. The spectacle frame mount of claim 4 further including a termination device, and wherein the overlapping spring wire ends are both slidably positioned in the termination device.

6. The spectacle frame mount of claim 5 wherein the termination device is a coil spring.

7. The spectacle frame mount of claim 6 further including a protective sheath overlying the coil spring.

8. The spectacle frame mount of claim 7 wherein the protective sheath is a heat shrinkable plastic.

9. The spectacle frame mount of claim 6 wherein the coil spring has coil ends adapted to reduce an effective diameter of the coil spring.

10. The spectacle frame mount of claim 5 wherein the termination device is a resilient sleeve.

11. The spectacle frame mount of claim 4 wherein the first and second spring wire ends are engageable with a wraparound lens of the face mask adjacent a base portion of the face mask.

12. The spectacle frame mount of claim 2 wherein the loop is downwardly opening.

13. The spectacle frame mount of claim 12 wherein the upper sections of the first and second portions of the spring wire are generally parallel.

14. The spectacle frame mount of claim 13 wherein the lower sections of the first and second portions of the spring wire form a circular base mount.

15. The spectacle frame mount of claim 14 wherein the first and second ends of the spring wire are adjacent each other.

16. The spectacle frame mount of claim 14 further including friction enhancing covers on the first and second ends of the spring wire.

17. The spectacle frame mount of claim 14 wherein the circular base mount is sized to retentively engage a base portion of the face mask.

18. The spectacle frame mount of claim 1 wherein the lower sections of the first and second spring wire positions are arcuate.

19. The spectacle frame mount of claim 1 wherein the bend in each of the spring wire positions is generally 90°.

20. The spectacle frame mount of claim 1 wherein a distance between the first and second ends of the spring wire is variable in response to the application of a force to the upper sections of the first and second spring wire portions.

* * * * *